(12) United States Patent
Liao et al.

(10) Patent No.: US 9,109,749 B2
(45) Date of Patent: Aug. 18, 2015

(54) OIL CHANGING DEVICE FOR A TRANSMISSION

(71) Applicants: Ying-Chieh Liao, Taichung (TW); Yu-Kuo Liao, Taichung (TW)

(72) Inventors: Ying-Chieh Liao, Taichung (TW); Yu-Kuo Liao, Taichung (TW)

(*) Notice: Subject to any disclaimer, the term of this patent is extended or adjusted under 35 U.S.C. 154(b) by 276 days.

(21) Appl. No.: 13/932,472

(22) Filed: Jul. 1, 2013

(65) Prior Publication Data

US 2014/0151156 A1 Jun. 5, 2014

(30) Foreign Application Priority Data

Dec. 4, 2012 (TW) .............................. 101223494 U (51) Int. Cl.
*F16H 57/04* (2010.01)
*F16N 31/00* (2006.01)

(52) U.S. Cl.
CPC ............ *F16N 31/00* (2013.01); *F16H 57/0408* (2013.01)

(58) Field of Classification Search
CPC .............................. F16N 31/00; F16H 57/0408
USPC ................................................ 184/1.5, 105.1
See application file for complete search history.

(56) References Cited

U.S. PATENT DOCUMENTS

| 3,867,999 | A | * | 2/1975 | Cox | 184/1.5 |
| 4,938,315 | A | * | 7/1990 | Ohta et al. | 184/1.5 |
| 4,946,005 | A | * | 8/1990 | Levine | 184/28 |
| 5,447,184 | A | * | 9/1995 | Betancourt | 141/98 |
| 5,722,508 | A | * | 3/1998 | Kraus | 184/1.5 |
| 6,071,355 | A | * | 6/2000 | Suratt | 134/21 |
| 6,227,332 | B1 | * | 5/2001 | Liao | 184/1.5 |
| 7,213,621 | B1 | * | 5/2007 | Chang | 141/86 |
| 2002/0148686 | A1 | * | 10/2002 | Yun et al. | 184/1.5 |
| 2008/0066823 | A1 | * | 3/2008 | Jin | 141/2 |
| 2011/0194953 | A1 | * | 8/2011 | Schalk et al. | 417/313 |

* cited by examiner

*Primary Examiner* — William E Dondero
*Assistant Examiner* — Robert T Reese (57) ABSTRACT

An oil changing device for a transmission includes a tub body having a receiving space for receiving transmission oil, a main assembly having a base body, a manual set and a backflow valve, the base body mounted to the tub body, the base body having a main channel, a first passage and a backflow passage, the base body configured to connect with one end of an injection tube, another end of the injection tube connected to a transmission, the injection tube communicating with the main channel, the base body having a through hole opened therethrough, the through hole communicating with the main channel, the manual set having a second passage defined therein, the first passage connected between the main channel and the second passage, the backflow valve inserted into the through hole, and the backflow valve selectively closing or unclosing the backflow passage.

7 Claims, 7 Drawing Sheets

OIL CHANGING DEVICE FOR A TRANSMISSION

BACKGROUND OF THE INVENTION

1. Field of the Invention

The present invention relates to a device, and more particularly to an oil changing device for a transmission.

2. Description of the Prior Art

Figure 1:
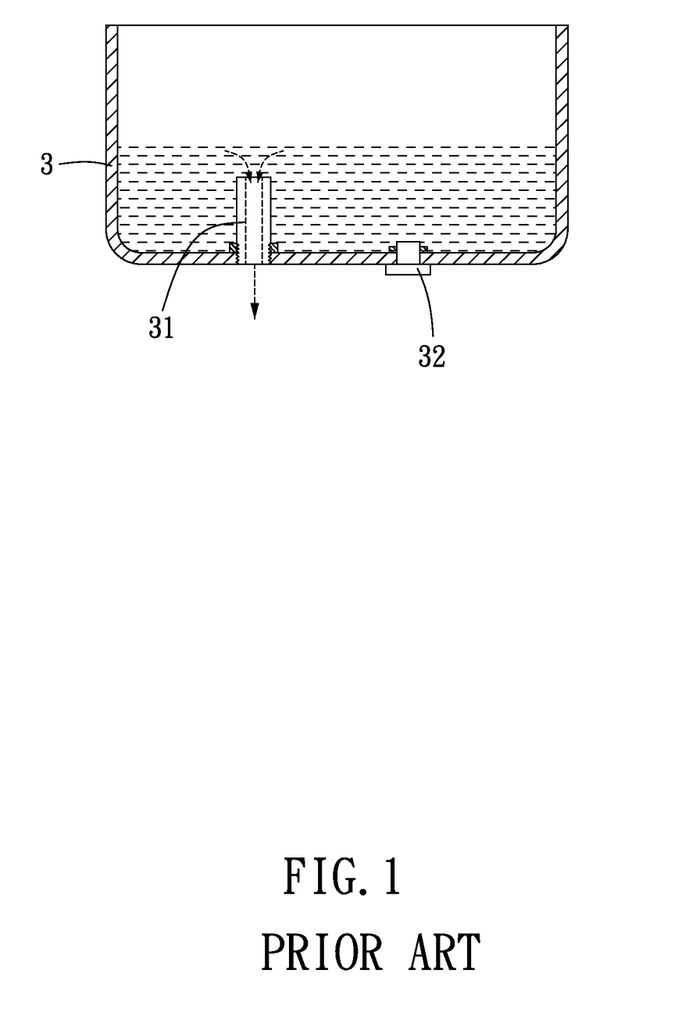
FIG. 1 is a side view of a prior art.
Figure 2:
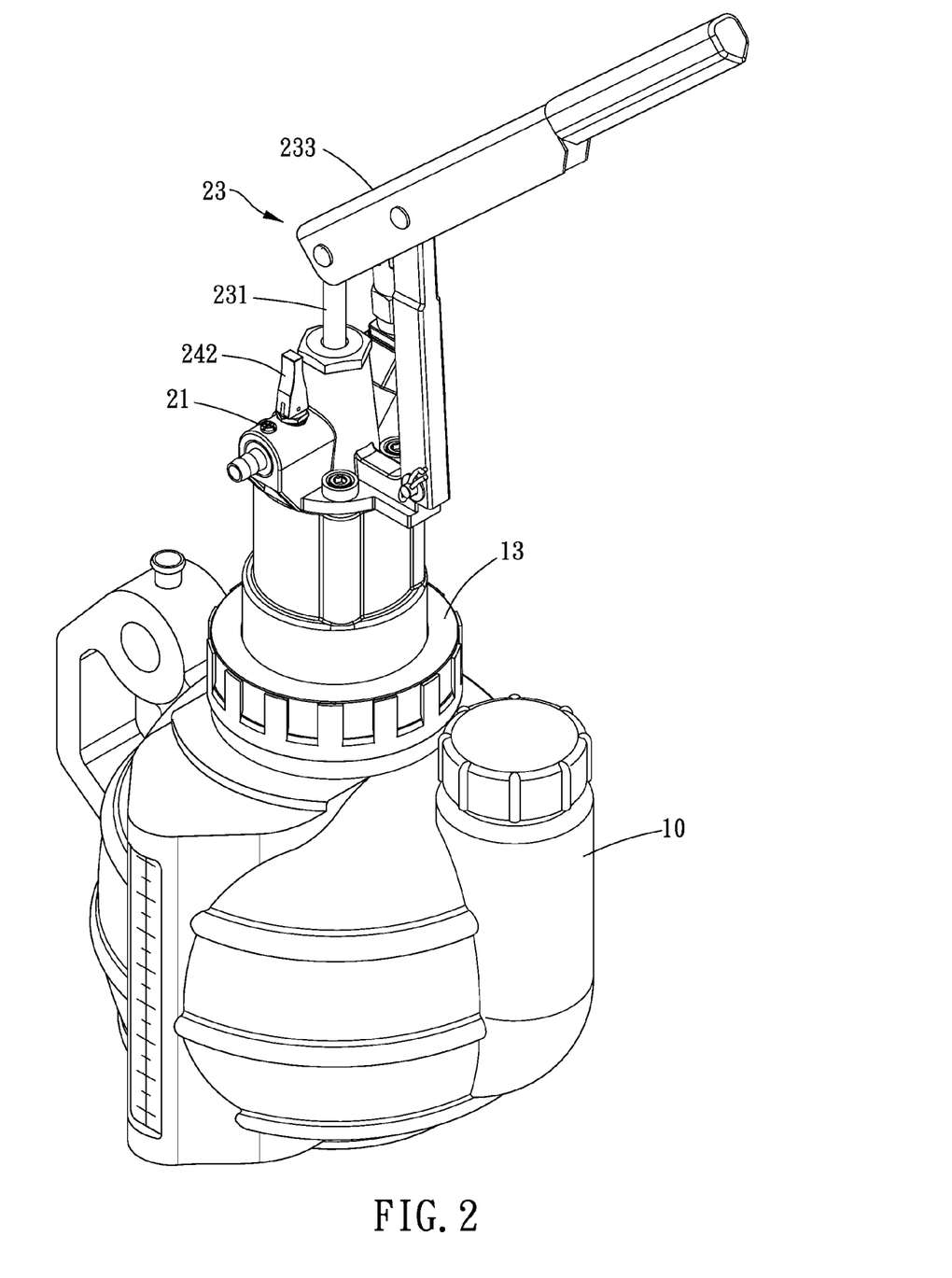
FIG. 2 is a perspective view of the present invention.
Figure 3:
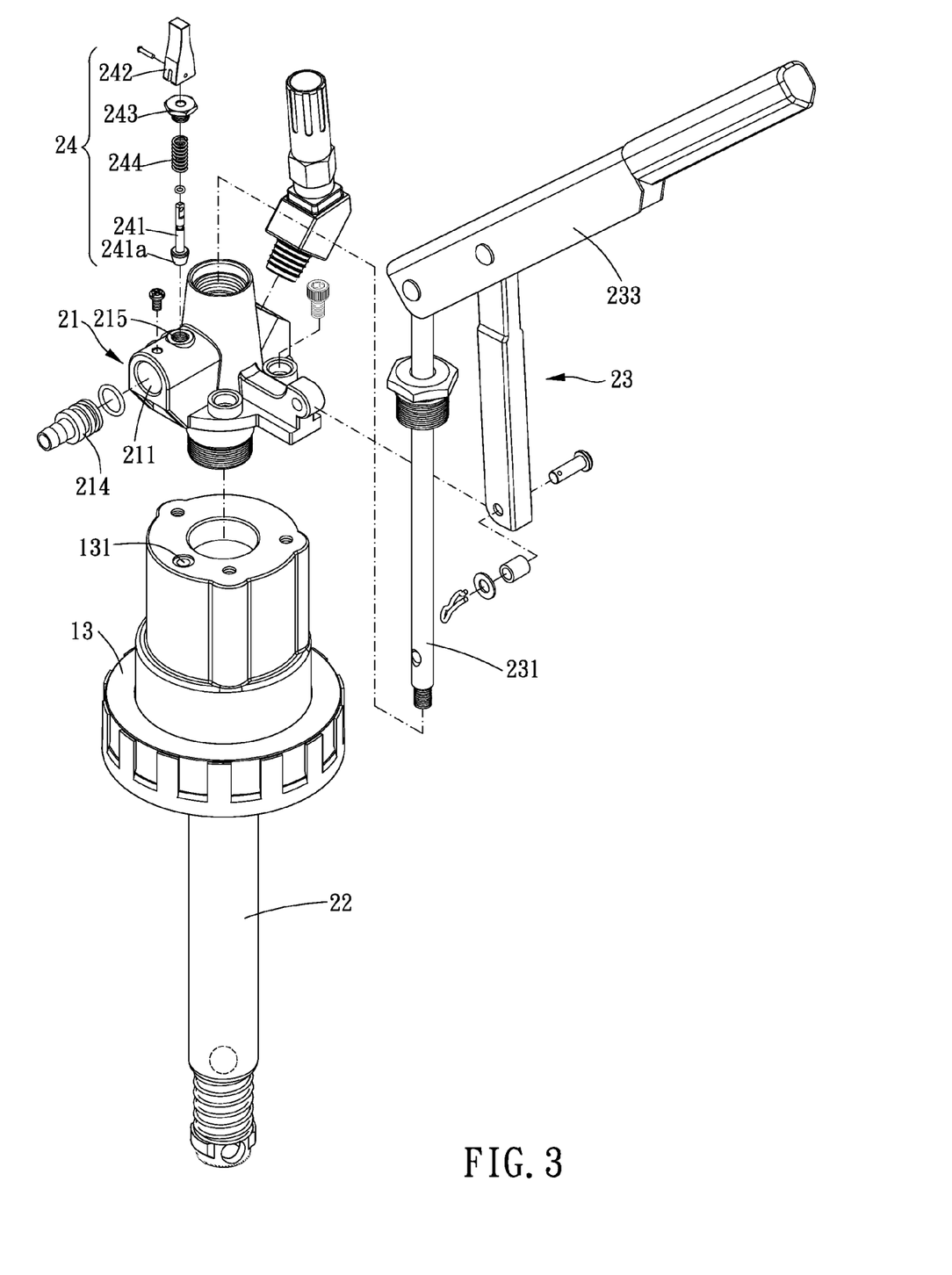
FIG. 3 is an exploded view of the present invention.
Figure 4:
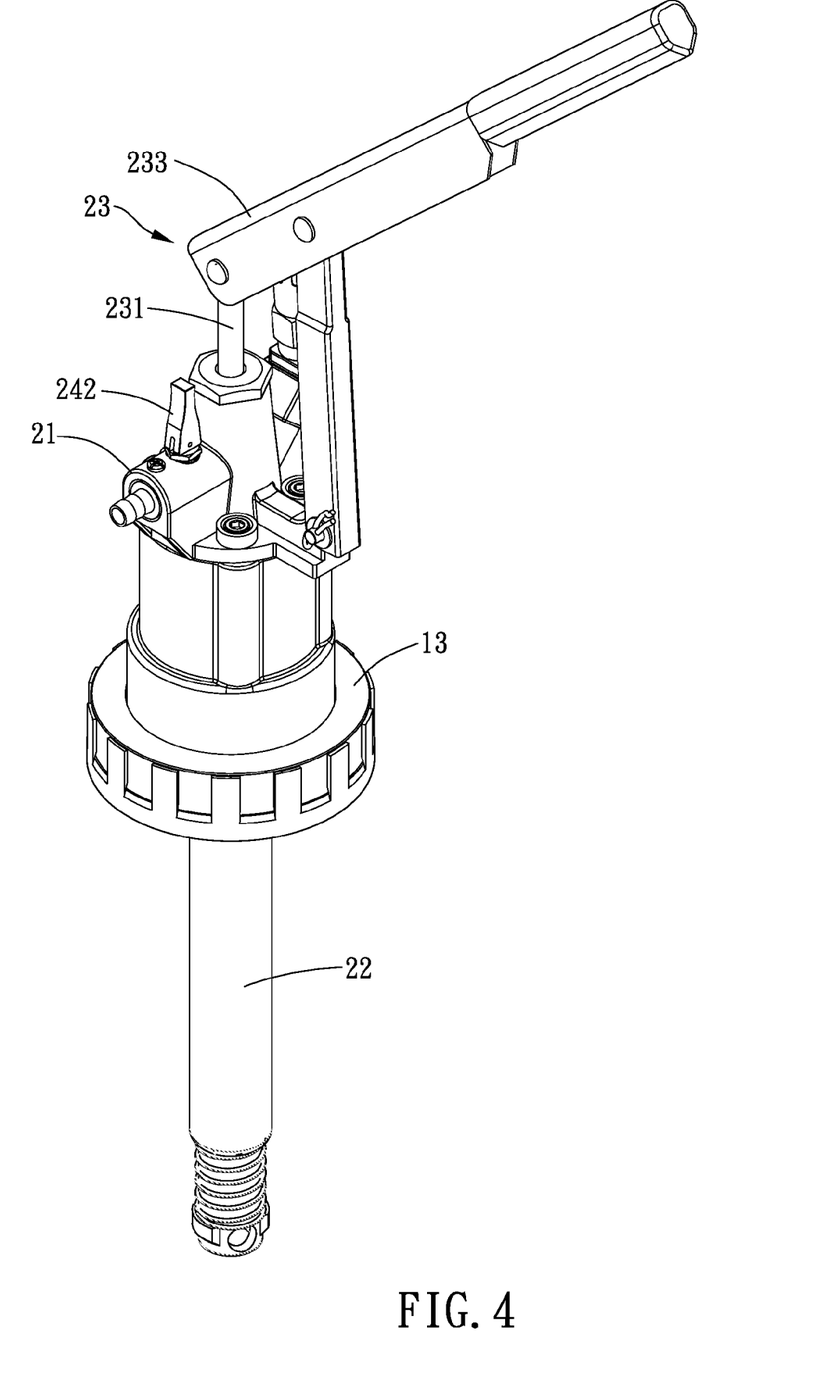
FIG. 4 is a perspective view of a main assembly of the present invention.

Please refer to FIG. 1, a conventional transmission 3 comprises an injection tube 31 and an oil-exporting hole. The conventional method for changing oil of the transmission 3 is to drain the oil by the oil-exporting hole, putting on a plug member 32 after draining the oil, and then connecting an oil tube with an opening of an oil importing tube to start infusing new oil. Note that the oil tube extends a certain length in the transmission 3. Thus, the oil level exactly touches a top end of the oil-importing tube when the transmission 3 is refueled.

When the new oil is infused too much so that the oil level is over the top end of the oil-importing tube, there are two ways to drain extra oil. The first way is as described in the first paragraph, and the second way is to use an oil-importing tube capable of adjusting extending length. After adjusting the oil-importing tube to a suitable length, the extra oil can be drained out from the oil-importing tube.

However, both two ways described above have complex steps to change the oil. And an extra container is needed for containing the oil drained. Although the oil left can be reused, the new oil drained may be polluted or oxidized.

On the other hand, according to the first way described in the first paragraph, the oil is easy to sprinkle on the ground or users because of a fast sprinkling speed. By the second way, a refueling device has to be removed to drain the oil. But the new oil would leak out from the oil-importing tube to the ground in the process of removing the refueling device, causing an unnecessarily waste. Users have to spend extra effort s for cleaning the oil stains; or the environment would be polluted. Furthermore, passengers would slip and fall or a fire would be occurred easily.

The present invention is, therefore, arisen to obviate or at least mitigate the above mentioned disadvantages.

SUMMARY OF THE INVENTION

An object of the present invention is to provide an improved oil changing device.

To achieve the above and other objects, an oil changing device for a transmission comprises a tub body having a receiving space defined therein, the receiving space used to receive transmission oil; and a main assembly having a base body, a manual set and a backflow valve, the base body mounted to the tub body, the base body having a main channel, a first passage and a backflow passage, the base body configured to connect with one end of an injection tube, another end of the injection tube connected to a transmission, the injection tube communicating with the main channel, the base body having a through hole opened therethrough, the through hole communicating with the main channel, the manual set having a second passage defined therein, a pump member and a check valve, the first passage connected between the main channel and the second passage, the pump member being movable in the second passage, the check valve mounted in the second passage, the backflow valve inserted into the through hole of the base body, the backflow valve selectively closing or unclosing the backflow passage, so that the backflow passage selectively communicates between the main channel and the receiving space.

Wherein the backflow valve has a thin portion; the thin portion has a first end and a second end; the thin portion is movably inserted into the through hole and is extended to the main channel; a diameter of the thin portion is smaller than a diameter of a cross-section of the main channel, so that when the first end of the thin portion closes the backflow passage, the transmission oil flows from the first passage to the main channel and then flows by the thin portion toward the injection tube; a plug unit is axially extruded from the first end of the thin portion; a diameter of the first end of the thin portion is greater than a diameter of the backflow passage; a shape of the plug unit corresponds to a cross-section of the backflow passage; when the first end of the thin portion seals the backflow passage, the backflow passage is plugged with the plug unit; the backflow valve has an elastomer; the elastomer is mounted around the thin portion; one end of the elastomer is abutted against the plug unit; the elastomer has a recovery force which pushes the thin portion toward the backflow passage; the backflow valve has a selecting member; the selecting member is pivoted on the second end of the thin portion; the selecting member is located outside of the base body; the through hole is longitudinally extended to the main channel; the manual set further has a pipe and a pump set; one end of the pipe is mounted to the base body; another end of the pipe is extended to the receiving space; the pipe has the second passage defined therein; the pump set has a piston rod and the pump member; the piston rod is longitudinally movable in the first passage and the second passage; the pump member is mounted at one end of the piston rod and is located in the second passage; the backflow valve selectively closes or uncloses the backflow passage; the piston rod moves the pump member between the first position and the second position in the second passage.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

FIGS. 2-5 show an oil changing device for a transmission of the present invention. The oil changing device for a transmission comprises a tub body 10 and a main assembly.

Figure 5:
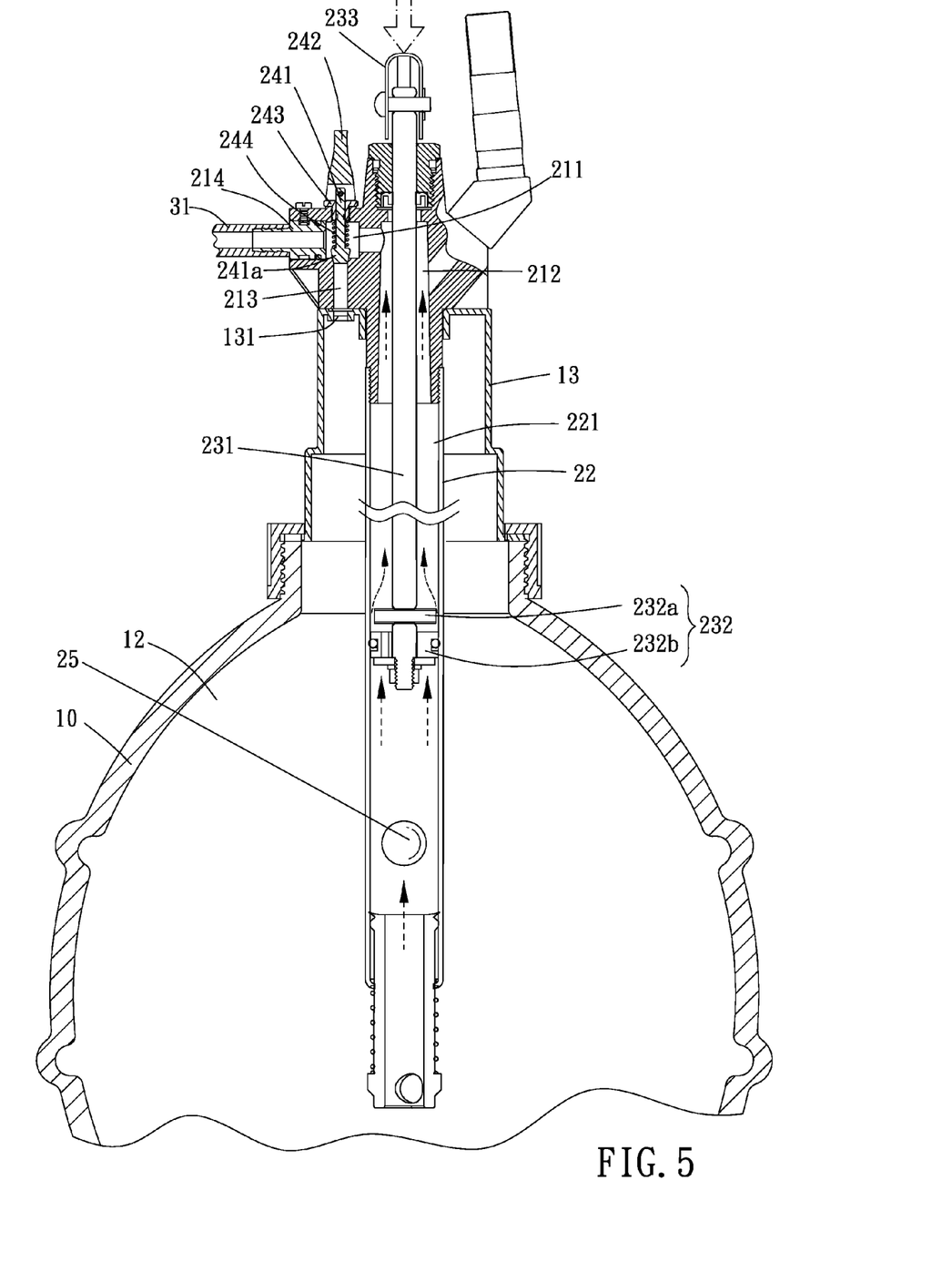
FIG. 5 is a side view of the present invention for showing that transmission oil flows through a check valve.

The tub body 10 has a top opening opened thereon and a receiving space 12 defined therein (as shown in FIG. 5). The top opening communicates with the receiving space 12. The tub body 10 has a cap 13 mounted on the top opening thereof. The cap 13 has a through opening 131 opened therethrough. The through opening 131 communicates with the receiving space 12. The receiving space 12 is used to receive transmission oil. Specially, receiving space 12 is used to receive brand-new transmission oil.

The main assembly has a base body 21, a manual set and a backflow valve 24.

The base body 21 is mounted at one end of the tub body 10. Specially, the base body 21 is mounted on the cap 13 of the tub body 10. The base body 21 has a main channel 211, a first passage 212 and a backflow passage 213. The base body 21 is configured to connect with one end of an injection tube 31. The injection tube 31 communicates with the main channel 211. Specially, the base body 21 has a connecting head 214. The connecting head 214 is inserted into an opening of the main channel 211 and is locked at the opening of the main channel 211. One end of the injection tube 31 is connected to the connecting head 214, so the injection tube 31 communicates with the main channel 211 via the connecting head 214. Another end of the injection tube 31 is connected to a transmission (not shown). The transmission is provided for a car. The first passage 212 communicates with the main channel 211. One end of the backflow passage 213 corresponds to the main channel 211. Another end of the backflow passage 213 corresponds to the through opening 131 of the cap 13. The main channel 211 selectively communicates with the first passage 212 via the backflow passage 213. The base body 21 has a through hole 215 opened therethrough. The through hole 215 communicates with the main channel 211 and corresponds to the backflow passage 213. Clearly, the through hole 215 and the backflow passage 213 are coaxial; specially, the through hole 215 is longitudinally extended to the main channel 211; the backflow passage 213 is longitudinally opened at a bottom of the main channel 211 of the base body 21 therethrough; the backflow passage 213 corresponds to the through hole 215.

The manual set has a second passage 221 defined therein, a pump member 232 and a check valve 25. The pump member 232 is longitudinally movable in the second passage 221. The check valve 25 is mounted in the second passage 221. Clearly, the manual set further has a pipe 22 and a pump set 23. One end of the pipe 22 is screwed to a bottom of the base body 21. Another end of the pipe 22 is extended to the receiving space 12. The pipe 22 has the second passage 221 defined therein. The first passage 212 communicates with the second passage 221. The first passage 212 is connected between the main channel 211 and the second passage 221. The second passage 221 communicates with the receiving space 12. The pump set 23 has a piston rod 231, the pump member 232 and an operated member 233. The piston rod 231 is longitudinally movable in the first passage 212 and the second passage 221. The pump member 232 is mounted at one end of the piston rod 231 and is located in the second passage 221. Specially, the pump member 232 has a piston member 232a and a valve member 232b. The operated member 233 is mounted at another end of the piston rod 231 and is located outside of the base body 21. Clearly, the operated member 233 is a lever. The lever is pivoted on one end of the piston rod 231. The lever is capable of driving the piston rod 231 to longitudinally move. The pump member 232 in the second passage 221 is longitudinally movable relative to the base body 21 via said motion of the piston rod 231. The pump member 232 is movable between a first position and a second position in the second passage 221. The check valve 25 is mounted at one end of the second passage 221 so that the check valve 25 is close to a bottom of the pipe 22. The check valve 25 allows the transmission oil in the receiving space 12 to flow through the check valve 25 into the second passage 221. The check valve 25 prohibits the transmission oil in the second passage 221 from flowing through the check valve 25 to the receiving space 12. Clearly, the check valve 25 is ball-shaped.

The backflow valve 24 is inserted into the through hole 215 of the base body 21. The backflow valve 24 selectively closes or uncloses the backflow passage 213. Clearly, the backflow valve 24 has a thin portion 241 and a selecting member 242. The thin portion 241 is movably inserted into the through hole 215 and is extended to the main channel 211. The thin portion 241 has a first end and a second end. A plug unit 241a is axially extruded from the first end of the thin portion 241. A diameter of the plug unit 241a is greater than a diameter of the backflow passage 213. A shape of the plug unit 241a corresponds to a cross-section of the backflow passage 213. The selecting member 242 is pivoted on the second end of the thin portion 241. The selecting member 242 is located outside of the base body 21. Specially, the backflow valve 24 further has a sleeve member 243 and an elastomer 244. The sleeve member 243 is partially inserted into the through hole 215. The thin portion 241 is movably and partially inserted into the sleeve member 243. The elastomer 244 is mounted around the thin portion 241. One end of the elastomer 244 is abutted against the plug unit 241a. Another end of the elastomer 244 is abutted against the sleeve member 243. The elastomer 244 has a recovery force which pushes the thin portion 241 toward the backflow passage 213.

Figure 6:
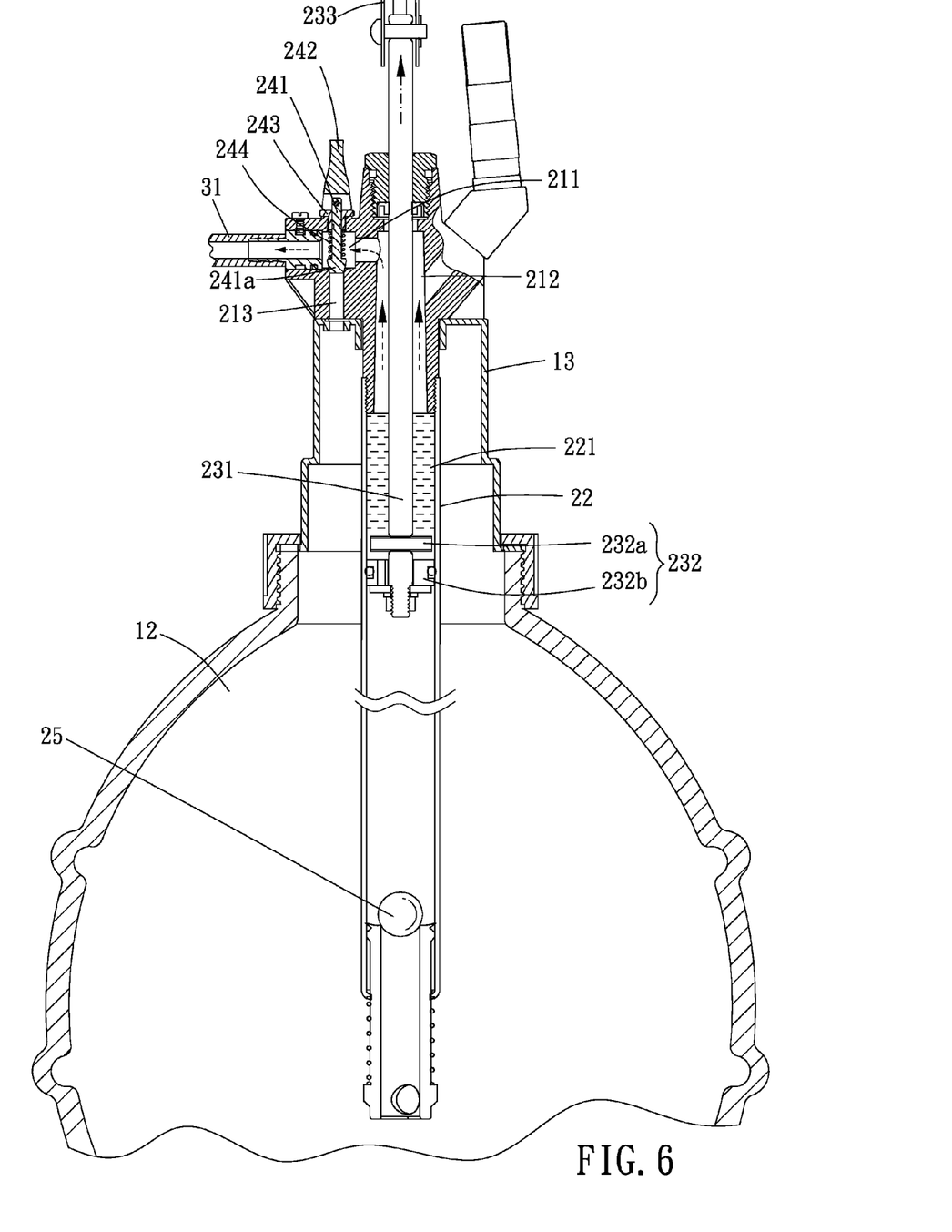
FIG. 6 is a side view of the present invention for showing that the transmission oil flows into a transmission.

Referring to FIG. 5, when a user wants to inject the transmission oil into the transmission, the user upwardly twists the selecting member 242 of the backflow valve 24 to move the backflow valve 24 toward an opening of the backflow passage 213, until the backflow passage 213 is plugged with the plug unit 241a at the first end of the thin portion 241; the backflow passage 213 is completely sealed so that the main channel 211 does not communicate with the backflow passage 213; then, the user presses the operated member 233 so as to drive the piston rod 231 to downwardly move the pump member 232 from the first position to the second position, so that the transmission oil in the receiving space 12 upwardly flows through the check valve 25 to the second passage 221 because an air pressure in the second passage 221 is changed; further, the transmission oil in the second passage 221 flows through the valve member 232b; thereafter, the piston rod 231 is upwardly pulled so as to move the pump member 232 back to the first position, so that the pump member 232 upwardly moves the transmission oil in the second passage 221; as a result, the transmission oil is injected into the transmission via the first passage 212, the main channel 211 and the injection tube 31. Specially, the valve member 232b of the pump member 232 is unidirectional, so that when the transmission oil is upwardly moved by the pump member 232, the transmission oil would not flow back through the valve member 232b. Moreover, a diameter of the thin portion 241 is smaller than a diameter of a cross-section of the main channel 211, so that when the first end of the thin portion 241 closes the backflow passage 213, the transmission oil flows from the first passage 212 to the main channel 211 and then flows by the thin portion 241 toward the injection tube 31 (as shown in FIG. 6).

Figure 7:
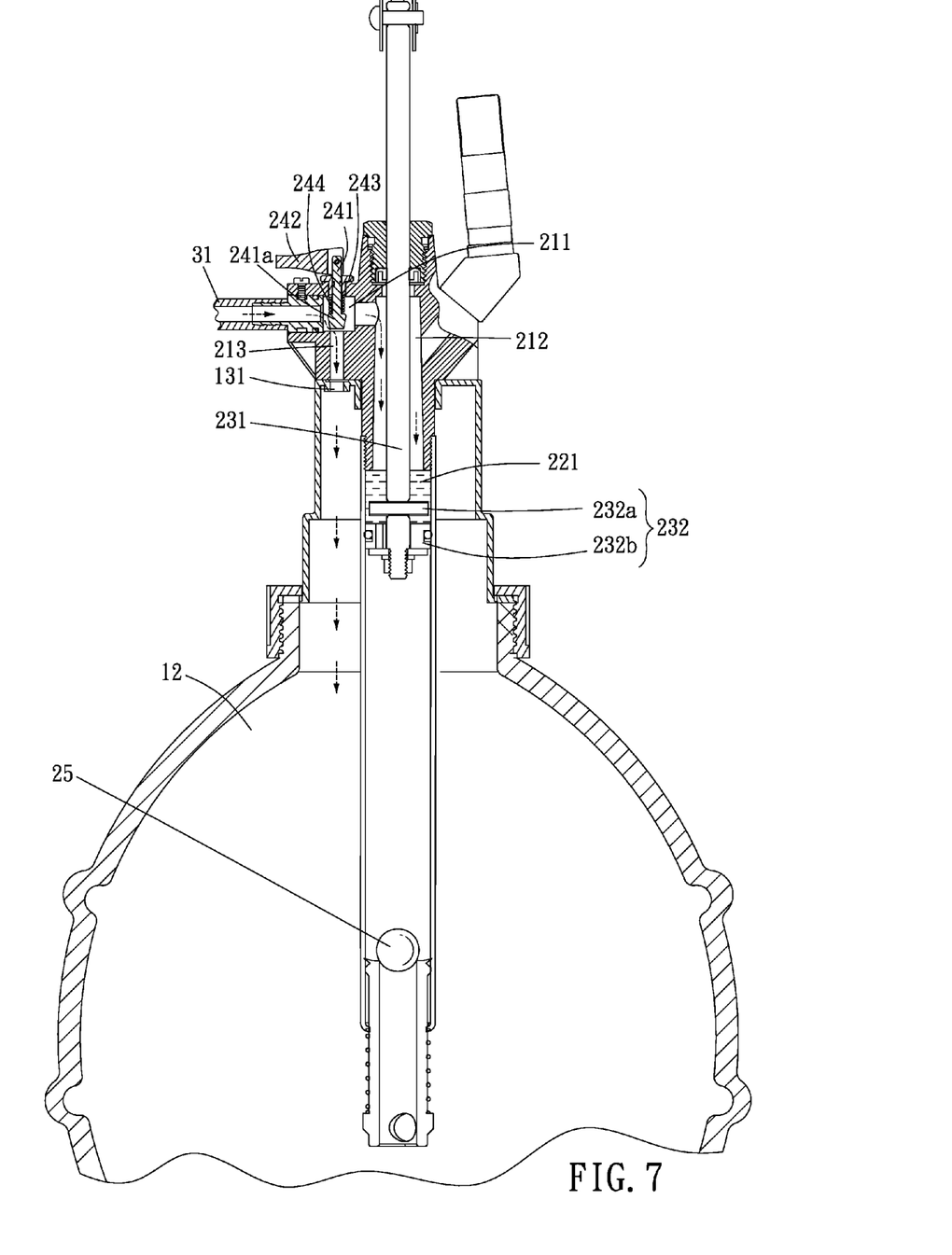
FIG. 7 is a side view of the present invention for showing that the transmission oil flows back.

When the transmission oil in the transmission is too much, a partial volume of the transmission oil should be drained from the transmission. Referring to FIG. 7, when the user wants to drain the transmission oil from the transmission, the user downwardly twists the selecting member 242 so as to remove the plug unit 241a at the first end of the thin portion 241 form the backflow passage 213; the main channel 211 communicates with the receiving space 12 because the backflow passage 213 is opened; as a result, the transmission oil in the transmission flows to the main channel 211 via the injection tube 31. Then, the transmission oil in the main channel 211 is divided into two volume; one volume of the transmission oil flows to the second passage 221 via the first passage 212, and would not flow through the check valve 25; clearly, the valve member 232b is unidirectional, so that the transmission oil in the second passage 221 is prohibited from flowing through the valve member 232b; another volume of the transmission oil flows to the backflow passage 213, and flows through the through opening 131 to the receiving space 12. Moreover, the elastomer 244 is currently compressed; when the user wants to stop said draining, the user upwardly twists the selecting member 242 back (as shown in FIG. 5); the elastomer 244 recovers from said compression, so as to drive the thin portion 241 to move toward the backflow passage 213, until the backflow passage 213 is plugged with the plug unit 241a.

Therefore, an extra container is not necessary for containing the drained transmission oil; the new transmission oil would not be polluted or oxidized; the drained transmission oil would received in the receiving space 12 rather than sprinkle on the ground or users.

Furthermore, the backflow valve 24 selectively closes or uncloses the backflow passage 213, so that the base body 21 needs only one injection tube 31 to injection the transmission oil into the transmission or drain the transmission oil from the transmission; a complicated structure is not necessary. The user can recognize whether the backflow passage 213 is closed or unclosed according to a pivoting position of the selecting member 242. If the user unexpectedly downwardly twists the selecting member 242 and the plug unit 241a slightly removes from the backflow passage 213, the recovery force of the elastomer 244 push the backflow passage 213 back right away; therefore, the transmission oil in the transmission would not unexpectedly flow to the receiving space via the backflow passage 213.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An oil changing device for a transmission comprising:
a tub body having a receiving space defined therein, the receiving space used to receive transmission oil; and
a main assembly having a base body, a manual set and a backflow valve, the base body mounted to the tub body, the base body having a main channel, a first passage and a backflow passage, the base body configured to connect with one end of an injection tube, another end of the injection tube connected to a transmission, the injection tube communicating with the main channel, the base body having a through hole opened therethrough, the through hole communicating with the main channel, the manual set having a second passage defined therein, a pump member and a check valve, the first passage connected between the main channel and the second passage, the pump member being movable in the second passage, the check valve mounted in the second passage, the backflow valve inserted into the through hole of the base body, the backflow valve selectively closing or unclosing the backflow passage, so that the backflow passage selectively communicates between the main channel and the receiving space.

2. The oil changing device for a transmission as claimed in claim 1, wherein the backflow valve has a thin portion; the thin portion has a first end and a second end; the thin portion is movably inserted into the through hole and is extended to the main channel; a diameter of the thin portion is smaller than a diameter of a cross-section of the main channel, so that when the first end of the thin portion closes the backflow passage, the transmission oil flows from the first passage to the main channel and then flows by the thin portion toward the injection tube.

3. The oil changing device for a transmission as claimed in claim 2, wherein a plug unit is axially extruded from the first end of the thin portion; a diameter of the first end of the thin portion is greater than a diameter of the backflow passage; a shape of the plug unit corresponds to a cross-section of the backflow passage; when the first end of the thin portion seals the backflow passage, the backflow passage is plugged with the plug unit.

4. The oil changing device for a transmission as claimed in claim 3, wherein the backflow valve has an elastomer; the elastomer is mounted around the thin portion; one end of the elastomer is abutted against the plug unit; the elastomer has a recovery force which pushes the thin portion toward the backflow passage.

5. The oil changing device for a transmission as claimed in claim 2, wherein the backflow valve has a selecting member; the selecting member is pivoted on the second end of the thin portion; the selecting member is located outside of the base body.

6. The oil changing device for a transmission as claimed in claim 1, wherein the through hole is longitudinally extended to the main channel.

7. The oil changing device for a transmission as claimed in claim 1, wherein the manual set further has a pipe and a pump set; one end of the pipe is mounted to the base body; another end of the pipe is extended to the receiving space; the pipe has the second passage defined therein; the pump set has a piston rod and the pump member; the piston rod is longitudinally movable in the first passage and the second passage; the pump member is mounted at one end of the piston rod and is located in the second passage; the backflow valve selectively closes or uncloses the backflow passage; the piston rod moves the pump member between the first position and the second position in the second passage.

* * * * *